(12) United States Patent
Pullmann et al.

(10) Patent No.: US 8,944,478 B2
(45) Date of Patent: Feb. 3, 2015

(54) LOCKING APPARATUS HAVING A TUMBLER FOR SAFETY DOORS

(75) Inventors: Juergen Pullmann, Ostfildern (DE); Roland Rupp, Ostfildern (DE); Andreas Veit, Ostfildern (DE)

(73) Assignee: Pilz Auslandsbeteiligungen GmbH, Ostfildern (DE)

( * ) Notice: Subject to any disclaimer, the term of this patent is extended or adjusted under 35 U.S.C. 154(b) by 0 days.

(21) Appl. No.: 13/562,718

(22) Filed: Jul. 31, 2012

(65) Prior Publication Data

US 2013/0020817 A1    Jan. 24, 2013

Related U.S. Application Data

(63) Continuation of application No. PCT/EP2011/051166, filed on Jan. 27, 2011.

(30) Foreign Application Priority Data

Feb. 2, 2010 (DE) .......................... 10 2010 007 388

(51) Int. Cl.
   *E05B 15/02*     (2006.01)
   *E05B 47/02*     (2006.01)
   (Continued)

(52) U.S. Cl.
   CPC ............. *E05B 47/023* (2013.01); *E05B 15/022* (2013.01); *E05B 47/0002* (2013.01);
   (Continued)

(58) Field of Classification Search
CPC ..... E05B 47/0046; E05B 47/00; E05B 45/00; E05B 47/0001; E05B 47/0696; E05B 63/0052; E05B 63/128; E05B 2015/0472; E05B 63/123; E05C 1/004; E05C 1/08; E05C 3/00; E05C 3/004; E05C 3/12; E05C 3/24; E05C 3/26; E05C 3/36; E05C 3/38

USPC ............ 292/340, 80, 81, 84, 89, 95–98, 100, 292/121–125, 127, 163, 171, 175, 194–197, 292/219–224, 227, 341.15, 341.16, 341.17, 292/347, 356, 357, DIG. 16, DIG. 25, 292/DIG. 30, DIG. 38, DIG. 56, DIG. 57, 292/DIG. 61, DIG. 65, 201; 70/174, 277, 70/278.1, 278.7, 279.1, 280; 307/326, 307/328; 200/61.62, 61.64, 61.67, 61.68, 200/332–334; 340/5.2, 5.7
See application file for complete search history.

(56) References Cited

U.S. PATENT DOCUMENTS 275,903 A * 4/1883 Gross ............................. 292/242
2,687,911 A * 8/1954 Burke ....................... 292/341.17
(Continued)

FOREIGN PATENT DOCUMENTS

CN    101812949 A    8/2010
DE    33 12 657 A1    10/1984
(Continued)

OTHER PUBLICATIONS

Computer Generated Translation for DE19735859A1, http://ep.espacenet.com.*
(Continued)

*Primary Examiner* — Kristina Fulton
*Assistant Examiner* — Alyson M Merlino
(74) *Attorney, Agent, or Firm* — Harness, Dickey & Pierce, P.L.C.

(57) ABSTRACT

A locking apparatus with tumbler for safety doors has a door part for fastening on a movable safety door and has a frame part for fastening on a door counterpart. The frame part has a receptacle and the door part has an actuator configured to be inserted into the receptacle. The frame part further has a blocking member which is displaceable between a release position, in which the actuator can be released in, and a blocking position in which the actuator is secured in the receptacle. The actuator is arranged on the door part via an elastic compensating element.

13 Claims, 5 Drawing Sheets

(51) Int. Cl.
  *E05B 47/00*  (2006.01)
  *F16P 1/02*  (2006.01)
  *F16P 3/08*  (2006.01)
  *E05C 3/06*  (2006.01)

(52) U.S. Cl.
  CPC .. *F16P 1/02* (2013.01); *F16P 3/08* (2013.01); *E05B 47/0004* (2013.01); *E05B 2015/0235* (2013.01); *E05B 2047/0086* (2013.01); *Y10S 292/65* (2013.01)
  USPC ............. 292/341.16; 292/201; 292/341.17; 292/DIG. 65

(56) References Cited

U.S. PATENT DOCUMENTS

| | | | |
|---|---|---|---|
| 2,777,315 A * | 1/1957 | Burke | 70/144 |
| 2,842,075 A * | 7/1958 | Rataiczak | 109/63.5 |
| 3,338,612 A * | 8/1967 | Howard | 292/340 |
| 3,919,869 A * | 11/1975 | Fromm | 70/263 |
| 4,540,208 A * | 9/1985 | Logan et al. | 292/341.19 |
| 4,565,994 A * | 1/1986 | Mochida et al. | 340/542 |
| 4,659,884 A | 4/1987 | Wollenhaupt | |
| 4,824,151 A * | 4/1989 | Taylor | 292/201 |
| 4,960,297 A * | 10/1990 | Bouse et al. | 292/223 |
| 5,432,309 A | 7/1995 | Takeuchi et al. | |
| 5,464,954 A | 11/1995 | Kimura et al. | |
| 5,518,040 A * | 5/1996 | Rupflin | 139/57 |
| 5,690,373 A * | 11/1997 | Luker | 292/201 |
| 6,194,674 B1 * | 2/2001 | Fukui | 200/43.04 |
| 6,283,514 B1 * | 9/2001 | Letzel | 292/142 |
| 6,539,760 B1 * | 4/2003 | Letzel et al. | 70/276 |
| 6,801,112 B1 * | 10/2004 | Saxer | 335/205 |
| 7,357,429 B2 * | 4/2008 | Eichenauer | 292/144 |
| 7,416,228 B2 * | 8/2008 | Pfitzinger et al. | 292/216 |
| 8,082,765 B2 * | 12/2011 | Bretschneider et al. | 70/95 |
| 2006/0033344 A1 * | 2/2006 | Blake | 292/173 |
| 2007/0204662 A1 | 9/2007 | Pullmann et al. | |
| 2009/0095037 A1 * | 4/2009 | Eisenhower et al. | 70/277 |
| 2010/0180511 A1 * | 7/2010 | Mahdi | 49/501 |

FOREIGN PATENT DOCUMENTS

| | | |
|---|---|---|
| DE | 38 04 176 A1 | 8/1989 |
| DE | 39 19 458 A1 | 12/1990 |
| DE | 197 35 859 A1 | 3/1999 |
| DE | 101 57 157 A1 | 6/2003 |
| DE | 10 2005 057 108 A1 | 5/2007 |
| DE | 10 2007 009 540 A1 | 8/2008 |
| EP | 1 795 676 A3 | 6/2007 |
| JP | 2006-299549 | 11/2006 |
| WO | WO 95/06323 | 3/1995 |

OTHER PUBLICATIONS

ISA/EP; English language translation of International Preliminary Report on Patentability (Chapter 1); issued by WIPO Aug. 7, 2012; 9 pp.

Search Report from the Patent Office of the People's Republic of China for corresponding Chinese Appl'n. No. 201180017587.1; Mar. 26, 2014; 2 pp.

* cited by examiner

LOCKING APPARATUS HAVING A TUMBLER FOR SAFETY DOORS

CROSS REFERENCES TO RELATED APPLICATIONS

This application is a continuation of international patent application PCT/EP2011/051166 filed on Jan. 27, 2011 designating the U.S., which international patent application has been published in German language and claims priority from German patent application DE 10 2010 007 388.1 filed on Feb. 2, 2010. The entire contents of these priority applications are incorporated herein by reference.

BACKGROUND OF THE INVENTION

The invention relates to a locking apparatus with tumbler for safety doors.

Together with safety doors and safety fences, locking apparatuses are commonly used for safeguarding machines and installations, from which a risk emanates in operation, against unauthorized access. Start-up of such machines should only be allowed when the locking apparatus issues a "door closed" signal. In addition, renewed access to the machines should only be permitted when the machine no longer poses any risk. This is achieved by means of a so-called tumbler, i.e. the locking apparatus is not released until there is a stop signal or a similar signal from the machine or machine controller.

WO 95/06323 A1 discloses a locking apparatus where the tumbler is realized by means of a longitudinally displaceable ram in the frame part, said ram securing a ratchet wheel in a defined state. The locking of the safety door can be brought about by an actuator in the form of a key, which is fastened on the door part and is inserted into a receptacle on the frame part. The actuator rotates the ratchet wheel such that the ram is able to latch into an indentation of the ratchet wheel caused by the force of a spring. Removal of the key from the receptacle is prevented in this way. For the controlled release of the key once the machine has stopped, the ram is realized as the anchor part of a solenoid valve such that when the solenoid valve is supplied with current, the ram is transferred by the anchor lift out of the latching position into a release position. The key can then be removed out of the receptacle. In the case of this known locking apparatus, the ratchet wheel is arranged in a first housing part which can be combined in different positions with a second housing part, the ram sitting in the second housing part. As a result, the door part and the frame part can be used in different assembly positions in relation to each other.

The known locking apparatus, however, requires really small assembly tolerances. The door part and the frame part have to be aligned precisely with respect to each other so that the key is able to engage in the receptacle of the frame part. The small assembly tolerances result from the fact that the actuator has to be held securely in the receptacle. On the other hand, manipulation of the locking apparatus, for instance by inserting an insulated metal bolt in place of the actuator, is to be counteracted. Consequently, the actuators of such locking apparatuses, as a rule, are complexly formed parts which cooperate with precisely matched ratchet wheels. As a rule, the receptacle for the actuator is also extremely tight. This results in the small assembly tolerances.

Small assembly tolerances make the assembly difficult. They can cause problems over time if the safety door sinks on account of its weight. DE 10 2005 057 108 A1, consequently, discloses a locking apparatus with a door part and a frame part which allow larger assembly tolerances. The door part has an actuator which can engage in a relatively large pocket on the frame part. A blocking member for blocking the actuator is arranged on the door part. Said known locking apparatus, however, does not provide any different assembly positions for the door part and the frame part in relation to each other and, consequently, is less flexible to use.

SUMMARY OF THE INVENTION

Against this background, it is an object of the invention to provide a locking apparatus that has a simple and sturdy design and can also be used in a flexible manner. It is another object to provide a locking apparatus that can easily be installed on a safety door, while it is able to ensure safe locking. It is yet another object to provide a locking apparatus that has a large assembly tolerance. Finally, it is an object to provide a locking apparatus that has a tumbler in combination with one or more of the aforementioned advantageous features.

In view of these and other objects, there is provided a locking apparatus with tumbler for safety doors having a movable door part and a door counter part, said locking apparatus comprising a door part designed for being fastened on the movable safety door, and comprising a frame part designed for being fastened on the door counterpart, wherein the frame part has a receptacle and the door part has an actuator configured to be inserted into the receptacle, wherein the frame part further has a blocking member which is displaceable between a release position, in which the actuator can be withdrawn from the receptacle, and a blocking position in which the actuator is secured in the receptacle, and wherein the actuator is arranged on the door part via an elastic element configured to allow a limited movement of the actuator relative to the door part.

In accordance with embodiments of the invention, tolerances, in particular component offset or component displacements, between the safety door and the door counterpart can be compensated or overcome due to the elastic element, which acts as a compensating element, such that simple assembly and secure operation are achieved even in the case of wear, offset caused by ageing or component deviations.

The elastic compensating element can have a distinct form changing capacity such that the tolerances, on the one hand, can be compensated at a first assembly and, on the other hand, deviations which are only produced over time, for instance setting operations or dimensional oscillations caused by temperature fluctuations, can also be compensated.

It should be mentioned that the stresses on the door part and on the frame part in the case of a misalignment between the safety door and the door counterpart can be reduced in comparison with conventionally designed locking apparatuses, because such deviations are now "caught" by defined deflection of the compensating element, as a result the remaining components are no longer aligned with respect to each other in a "tensioned" manner in the blocking position on account of said deviations.

It is to be understood that the term "safety door" can generally include flaps, covers, hoods and in particular also sliding doors and pivoting doors, i.e. elements which are used to enable access to a machine or system, but which are closed in a secure and monitored manner during the operation of said machine or system.

In a preferred refinement of the invention, the elastic compensating element is made of a plastics material, preferably made of an elastomer and/or a rubber material.

In this way, the elastic compensating element can be produced in a particularly simple manner, namely in an almost arbitrary 3D form. In this connection, deforming characteristics of the elastic compensating element can be influenced in a simple manner by this refinement, in particular, as an option, it is possible to bring about linear, progressive or regressive force/path characteristics which can also be directionally dependent.

In an advantageous manner, the elastic compensating element can have materially bonded joints such that the form changing capacity is not just limited to deformation of the plastics material itself, but, moreover, an anisotropic form changing capacity can be realized by means of leverage or directionally dependent rigidities.

In this way, for example, a vertical offset between the safety door and the door counterpart can be compensated in a particularly simple manner in the region of the locking apparatus by designing the elastic compensating element in a particularly flexible manner in this direction. With reference to other deviations, such as a lateral offset between the safety door and the door counterpart for instance, the elastic compensating element can be designed, contrary to this, in a clearly more rigid manner, where required; in particular, when the safety door is pivotable in the direction of the door counterpart and as a result a lateral offset can be compensated substantially by the pivoting movement.

Suitable plastics materials, in particular elastomers, have good corrosion resistance and can be realized in a sufficiently resistant manner with regard to media and environmental influences such that the locking apparatus can be operated with a small amount of wear and a small amount of expenditure on repairs.

Suitable methods for the connection between the elastic compensating element, the actuator and the door part can be, on the one hand, conventional assembly processes, such as, for instance, clamping or screw connecting. Moreover, further methods, such as bonding, embedding, injection molding or suitable combinations, can be used in an advantageous manner in the case of plastics materials. Elastomer compensating elements are also suitable for vulcanizing, as a result they can be connected directly and securely to metal parts.

In this connection, it should be mentioned that the compensating element can also be made of other elastic materials in other refinements; in particular, metallic materials which have a high level of rigidity but also distinct elasticity are suitable for this. Thus, the elastic compensating element can have, for example, metal springs or joints in order to be able to achieve a suitable stress-strain behavior. In other words, in the case of an elastic compensating element of metal, in spite of the high level of rigidity, it is possible by means of suitable structural measures to bring about a form changing capacity, which allows it to bridge and compensate deviations between the safety door and the door counterpart.

The elastic compensating element preferably has reinforcing inserts which, in a further preferred manner, consist of plastic material fibers.

The fiber reinforcement, in this case, can have an ordered or an unordered weave which can consist of a wire material, of glass fibers, aramid fibers, carbon fibers or the like. Using these types of reinforcing inserts, the strength, in particular the strength against cracking, of the elastic compensating element is increased, while the elastic characteristics can essentially be maintained. As an alternative or in addition to this, pull-off protection for the elastic compensating element can be provided between the actuator and the door part, with said pull-off protection could be made of the aforementioned materials. With pull-off protection, even if the elastic compensating element fails, the safe state, i.e. the closed state, can be maintained.

In accordance with a refinement of the invention, the elastic compensating element has a plurality of webs (in particular at least three) which are arranged about a (preferably central) receiving region. The webs preferably have thickened ends on their end remote from the receiving region, said thickened ends being advantageously cylindrical.

The elastic behavior of the elastic compensating element can be influenced in a favorable manner in this way. Thickened ends at the ends of the webs make possible a simple and rotationally fixed assembly, for example in an assembly frame with a three, four or multi-cornered outline. The compensating element of this development can have a star-shaped or cross-shaped top view which can be extruded in depth. Consequently, the elastic compensating element can be particularly flexible in a radial manner with respect to the extrusion direction by the deforming of the webs, but with respect to lateral stresses which essentially act in the extruding direction, it can have increased rigidity.

In an advantageous refinement, the actuator has an actuator frame in which the thickened ends are arranged, and the door part has a receiving profile on which the receiving region is mounted.

Due to this refinement, the elastic compensating element can preferably operate in an advantageous manner as a materially bonded rotary joint, more generally as a materially bonded Cardan joint. Insofar as the elasticity of the compensating element allows, the door part received for instance centrally on the receiving region can be displaced in relation to the actuator frame, which can surround the elastic compensating element in an approximate manner, in order to compensate tolerances between the safety door and the door counterpart.

In addition, a stop for the elastic compensating element can be realized in a particularly simple manner due to such a refinement of the actuator frame and of the door part; excessive stresses and deformations of the elastic compensating element can thus be avoided. The reliability of the locking apparatus can be increased.

In a further preferred manner, lead-in inclinations are provided at least on the actuator or on the receptacle of the frame part.

The lead-in inclinations can facilitate the introduction of the actuator into the receptacle, said actuator being received in a flexible manner due to the elastic compensating element, such that the actual seat of the actuator does not have to be developed specifically for tolerance compensation. The lead-in inclinations, for instance in a funnel-shaped manner, allow maximum deviations to be compensated, such as the offset where the actuator can pass automatically into the receptacle when the safety door is closed. In this connection, it is preferred to compensate an offset of at least ±5 mm, and, more preferably, at least ±10 mm.

It goes without saying that the lead-in inclinations can allow different directionally dependent deviations with reference to a vertical offset or a lateral offset or however with regard to inclined positions between the door part and the frame part.

In a further refinement of the invention, the blocking member has at least one blocking counter surface and the actuator has at least one blocking surface, which surfaces are configured to secure the actuator in the blocking position in a form-fit manner in relation to the receptacle.

A form-fit locking can absorb particularly high forces and does not easily yield or "slip through" compared to non-form-fit locking in the case of impact-like or jerk-like load peaks. It goes without saying, however, that other locking components can be superposed on the form-fit locking. A form-fit locking can be detected and monitored easily using simple means.

In a preferred refinement of the invention, the actuator has a recess which defines a space for displacing the blocking member, with the recess preferably being realized together with the at least one blocking surface on the actuator as an M-shaped incision.

Due to this refinement, the freedom of movement of the actuator or of the blocking member can be ensured even if there were dirt accumulation or contamination of the locking apparatus, for instance by means of chips. In an advantageous manner, the blocking member is displaceable for the selective locking or release of the actuator. Said movement is effected in relation to the actuator. If a locked system, such as a machining center for instance, is to be made accessible after operation, it is possible that dirt accumulation caused by chips can impede the relative movement of the blocking member in relation to the actuator. In this refinement, a second recess is now provided on the actuator, said second recess allowing the displacement into the release position even if chips were to be situated in the region between the actuator and the blocking member; this holds true for a pivotable blocking member in particular. Consequently, an approximately M-shaped incision might be arranged on the actuator, with one region of said incision having the at least one blocking surface and another region being able to receive chips or the like displaced by the blocking element.

In a refinement of the invention, there is a drive, preferably a solenoid magnet, which is coupled to the blocking member for the displacement of the same.

Consequently, the blocking member can be displaced in a particularly simple manner, such as by feeding current to the solenoid magnet. The solenoid magnet is preferably realized as a lifting magnet, but other models are conceivable. In addition, other types of drives can be used, such as electromotors, in particular linear motors, or piezo-resistive or magneto-resistive drives. In the case of particular environmental conditions, it is also possible to use drivers which have compressed air cylinders or hydraulic cylinders.

In a preferred refinement of the invention, there is a safety spring which is coupled to the blocking member and pushes the blocking member in the direction of the blocking position.

The safety spring enables automatic locking, in particular when the closed state is to be held without current being passed through the magnet. In addition, automatic locking can be effected by inserting the actuator; in this connection, the blocking member is initially displaced by the actuator against the force of the safety spring in order to latch, then, into the at least one blocking counter surface of the blocking member with the at least one blocking surface as a result of the force of the safety spring in the blocking position. In this way too, a particularly safe, namely automatically locking operation of the locking apparatus can be promoted with a simple design.

It should be mentioned that the locking apparatus can also be operated, where required, in such a manner that the system is open without current. In this case, locking can be effected by continuously supplying current to the drive. This type of operation is useful when, for instance, if there is a failure or a fault in the machine or system to be enclosed, rapid opening of the locking apparatus appears to be more important than an unconditional tumbler.

The safety spring can be supported on the housing of the frame part and can act directly on the blocking member, or it can be connected by means of coupling members to said blocking member.

In a further refinement of the invention, the blocking member is received so as to be longitudinally displaceable on the frame part.

Consequently, the blocking member itself can be realized as part of the drive, for instance as part of the anchor of the magnet. As a result, the lift of the magnet leads immediately and directly to a displacement of the blocking member. Expenditure on components and manufacturing during the production of the locking apparatus can be reduced.

It is conceivable to couple the blocking member indirectly to the drive by means of levers or other coupling elements in order, where applicable, to be able to bring about a force and path conversion when displacing the blocking member.

In an advantageous refinement of the invention, the actuator has cone surfaces and a seat corresponding thereto, said seat having cone counter surfaces and being arranged on the frame part, and the blocking member is configured to secure the position of the actuator in the seat, preferably in a form-fit manner.

This refinement makes it possible to insert the actuator from any direction within a movement plane into the receptacle, since now a conical, more generally a rotationally symmetrical, seat is realized, the axis of which can be realized vertically with respect to the movement plane. Consequently, with only one embodiment of the locking apparatus different supply positions or installation positions can be realized such that the multiple variants and the assembly expenditure can be reduced.

In other words, the cone surfaces and the cone counter surfaces account for a pan-like seat of the actuator on the frame part. The supply of the actuator can be effected radially with respect to the axis of rotation of the seat such that the elastic compensating element can make it possible for the actuator to deflect when overcoming a wall of the cone counter surfaces.

In this connection, the blocking element can also be displaceable radially in the direction of the axis of rotation of the seat in order to selectively cooperate with the at least one blocking surface of the actuator for blocking or release of said actuator.

In this case, the actuator can be supplied to the seat for example from three sides offset with respect to each other in each case by 90°, whilst the blocking member can act on the actuator from the fourth side for locking the actuator.

In a further refinement of the invention, the blocking member is arranged so as to be removable on an entrainment shaft which is pivotable about an axis. Preferably, the blocking member is arranged on the entrainment shaft manner in a form-fit manner, Consequently, the blocking member can be pivoted about the axis for securing or releasing the actuator. Inserting the actuator into the receptacle from different directions is made possible in this way too. To this end, the blocking member just has to be rotated on the entrainment shaft corresponding to the supply direction such that the pivoting movement of the blocking member, produced by the actuation of the actuator or the resetting force of the safety spring, is assigned in a positionally correct manner to the actuator.

It is particularly preferred when the blocking member is arranged on the entrainment shaft in a form-fit manner. The form-fit lock can be provided by means of a suitable profile, the graduation of the profile determining the different available positions of the blocking member on the entrainment shaft. Thus, in the case of a square profile, four different positions are produced, each offset by 90°. Consequently, with only a little expenditure on fitting or refitting, the locking apparatus can be adapted to different operating and installation conditions without parts having to be exchanged or additional parts having to be taken into consideration. Along with the blocking member, the receptacle, into which the actuator can be inserted, can also be displaced corresponding to the insertion direction of the actuator such that the supply direction is determined by way of the lead-in inclinations. As an alternative to this, the receptacle can have lead-in inclinations for several supplying directions such that the refitting of the same is not necessary.

In a preferred refinement of the invention, a coupling element, which is preferably realized as a thrust rocker, is arranged between the actuator and the entrainment shaft.

A force or path translation, a movement reversal and a conversion of a translatory movement into a rotational movement or vice versa can be effected by means of the coupling element.

Consequently, particularly simple, reliable and cost-efficient actuators can be used even when the blocking member is not meant to carry out linear movements together.

In particular, a thrust rocker is suitable to convert the translatory movement of a magneto inductor into the rotational movement, more accurate pivoting movement, of the blocking member.

In a particularly advantageous refinement, which also represents an invention independently of the elastic compensating element, a manipulation detector, which is realized for the purpose of recognizing whether the blocking member is mounted, is provided on the frame part.

In an advantageous manner, this can be an optical manipulation detector, for instance a light barrier, by means of which the presence of the blocking member on the frame part is detected. In principle, the manipulation detector, however, can also be realized with an inductive, capacitive, magnetic or other sensor, which detects the presence of the blocking member on the frame part in a failsafe manner. It is preferred when the locking apparatus provides an output signal which, in the case of the lack of the blocking member, represents a switch-off signal and/or vice versa represents a release signal in the case of the detected presence of the blocking member. Through this development, manipulation, for example dismantling the blocking member to bypass the locking apparatus can be effectively stopped.

In a particularly advantageous manner, a coupling member, which is part of the coupling element, and/or the blocking member itself can have an indicator, to which the manipulation detector responds. This can be, for example, for instance a bracket or a recess which can interrupt or expose the light section of the light barrier in a selective manner. In the case of the blocking position, for instance a stop of the blocking member can abut against a stop counter surface of the receptacle, the safety spring still acting upon the blocking member in the direction of the stop. If the blocking member is then removed, the safety spring can bring about a further displacement, for instance a pivoting of the entrainment shaft beyond said stop position. This results in a state which cannot be achieved with the correctly assembled blocking member. In this state, the manipulation detector can now be addressed by the indicator in order to generate an output signal, by way of which the operation of the machine or system to be enclosed can be prevented to protect the operator.

In a further refinement of the invention, a transponder is arranged on the actuator and a position detector on the frame part, said transponder and position detector cooperating in such a manner that a release signal can be generated when the actuator is secured on the frame part and the blocking member is situated in the blocking position.

A transponder of this type can be an RFID unit, for instance, which can be read out from the frame part.

In this way, locking can be recognized in a particularly failsafe manner, namely only when the actuator is actually inserted into the receptacle.

The transponder is preferably supplied with energy in a wireless manner by the position detector such that the design of the locking apparatus is clearly simplified as no supply lines have to be supplied to the door part.

In the case of an RFID unit, positional recognition can be carried out in an encoded manner such that manipulation, for example with a further RFID chip, is made more difficult.

It is possible to arrange the position detector on the receptacle to read out the RFID unit such that precisely the supplying of the actuator can be recognized. As an alternative to this, the position detector can be provided on the blocking member in order to be able to detect in a failsafe manner, along with the supplying of the actuator, also the locking, namely the securing of the actuator by means of the blocking member.

It is further preferred when the transponder has an antenna and a signal unit which are coupled by means of at least one line and are at a spacing from each other, the antenna is preferably arranged in a region of the actuator which is facing the blocking member during locking, and the signal unit is arranged in a region of the actuator at a spacing therefrom, which is facing the door part.

In this way, damage to or failure of the actuator can be better recognized because the transponder, in the case of this refinement, extends almost over the entire length of the actuator; in the case of damage, the at least one line or the antenna could be separated such that the inductivity of the loop antenna changes. Consequently, even in the case of a further intact signal unit, the failure can be recognized as the transponder either no longer sends out anything or sends it at a changed frequency.

Provided in another refinement of the invention is an unlocking mechanism which is coupled to the blocking member in order to move it selectively in the direction of the release position.

This means that it is possible to bring about an emergency unlocking procedure which is preferably realized in a mechanical manner in order to be able to open the locking apparatus in the event of a system failure. Preferably, the unlocking mechanism is to be arranged on the inside of the enclosure in order to enable an inadvertently locked-in operator to leave the enclosure at all times.

In a preferred refinement of the invention, a control unit is provided which is designed for receiving, processing and transmitting signals by means of an interface, wherein the interface has at least one connection, with a first unidirectional mode where the connection is realized either only for transmitting or receiving signals, and with a second, selectively activatable mode where the connection is realized in the manner of a bidirectional connection for transmitting and receiving signals.

Consequently, several locking apparatuses can be connected, where applicable together to further safety devices, a control device being connected by means of cabling. In this connection, the cabling can simply be realized using few lines as in the case of the second mode several locking apparatuses can be connected in series.

In other words, the locking apparatus can be controlled by means of a bus line in the second mode. In this connection, it is to be observed that in the case of a locking apparatus an internal bus can be provided such that in the case of a selectively activatable bus mode, signals from an upstream series-connected locking apparatus can be received by means of an input, where applicable processed and forwarded by means of an output together with signals generated by the locking apparatus itself to a downstream series-connected locking apparatus and finally to a control device.

A safety arrangement can be realized in this way, where a control device is linked by means of a bus in a ring-shaped manner or linear manner to the locking apparatus and to at least one further locking apparatus or to at least one safety device. In particular, star-like cabling, as would be necessary in the case of discrete signal lines, can be avoided. Such a safety arrangement can be installed, altered or extended at little expenditure, only minimal interventions into existing cabling being necessary.

It goes without saying that the aforementioned features of the invention and the features of the invention yet to be mentioned below are usable not only in the combinations specified in each case, but also in other combinations or standing on their own without departing from the framework of the present invention.

BRIEF DESCRIPTION OF THE DRAWINGS

Further features and advantages of the invention will become apparent from the following description of several preferred exemplary embodiments with reference to the drawings, in which.

DESCRIPTION OF PREFERRED EMBODIMENTS

Figure 1:
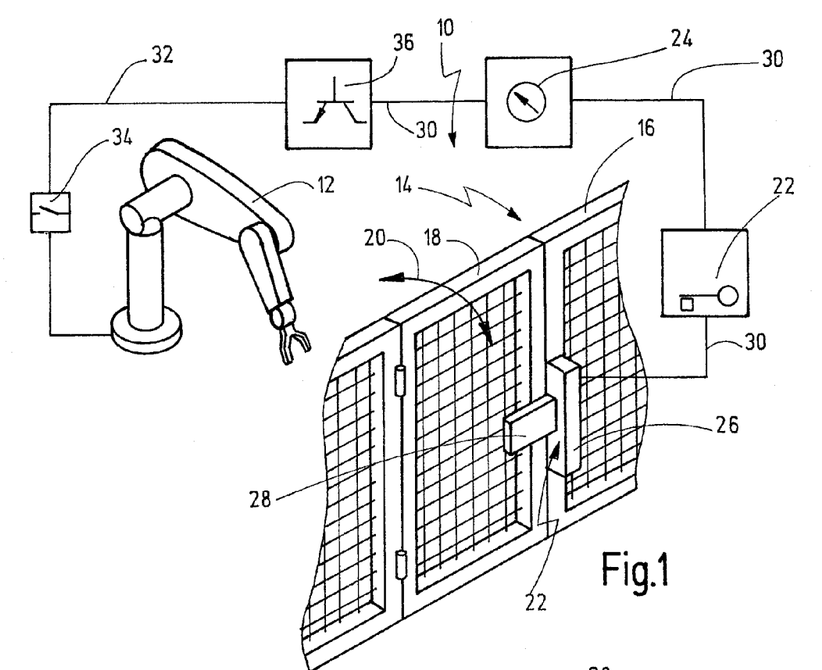
FIG. 1 shows a perspective schematic view of a system with a safety arrangement with a locking apparatus according to an embodiment the invention.

A safety arrangement with a locking apparatus 22 according to an embodiment of the invention is shown in FIG. 1 and given the overall reference 10. The safety arrangement 10 is designed for safeguarding the operation of a robot 12. An enclosure 14, which can surround the robot 12 completely, is provided (only shown in a fractional manner here) for this purpose.

It goes without saying that these types of safety arrangements can also be used to enclose machine tools, processing centers, foundry machines, transport and handling apparatuses, generally speaking such arrangements, the operation of which can be potentially dangerous to careless personnel. In particular, reference is made in this context to high closing forces, for instance in the cases of presses, high rotational speeds, for instance in the case of turning centers, and rapidly-moving, hardly detectable movement paths, for instance in the case of handling robots. In addition, the enclosure 14 can be used in order to protect operators or other persons from emissions, for example noise, vibrations or for the isolation of harmful materials of the systems to be enclosed.

It is necessary to develop the area surrounded by the enclosure 14 so as to be accessible for maintenance purposes, for charging, for repairs or for other reasons. For this purpose, the enclosure 14 has, along with fixed parts, for instance a door counterpart 16, a safety door 18 which is pivotable for opening the enclosure 14, as is also indicated by an arrow given the reference 20.

It will be understood that the safety door 18 may also be a sliding door, a folding door, a slidable lattice grate, a flap or another element, which can make the space surrounded by the enclosure 14 accessible.

It is noted that the safety door 18 can only be opened when the system to be enclosed, in this case the robot 12, is put out of operation and in the event of an overrun, for instance in the case of a tool spindle, has come to a complete standstill. In reverse, putting it into operation, that is to say switching on the robot 12, is only allowed once the safety door 18 has been securely closed.

Functionality of this type is often referred to as a tumbler. Thus, a locking apparatus 22 with tumbler functionality is arranged on the enclosure 14, where a frame part 26 is provided on the door counterpart 16 and a door part 28 is provided on the safety door 18.

By way of example, the safety arrangement 10 has two locking apparatuses 22, of which one is shown in a symbolic manner. In addition, a further safety device 24 may be provided, such as a measuring pick-up for monitoring operating parameters of the robot 12. The safety device 24 can be realized for detecting or monitoring, for instance, end positions, absolute or relative accelerations, received loads or operating times of the robot 12.

The locking apparatuses 22 and the safety device 24 are connected by means of a connecting line 30, again only shown in a simplified manner, to a control device 36 which is connected by means of a safety line 32 to a safety switch 34, which is designed for releasing the operation of the robot 12. This is only to be effected, in particular, if the locking apparatuses 22 are securely closed.

The tumbler can be achieved in such a manner that after switching off the robot 12, a determined runout time is waited for and only after this runout time has expired is it possible to open the lock. As an alternative, the release of the locking apparatus 22 can be brought about by means of a signal which characterizes the actual stopping of the robot 12, e.g. monitored by the safety device 24. In this way, runout times can be reduced to match requirement although a premature release of the locking apparatus 22 is prevented in a secure manner.

Figure 15:
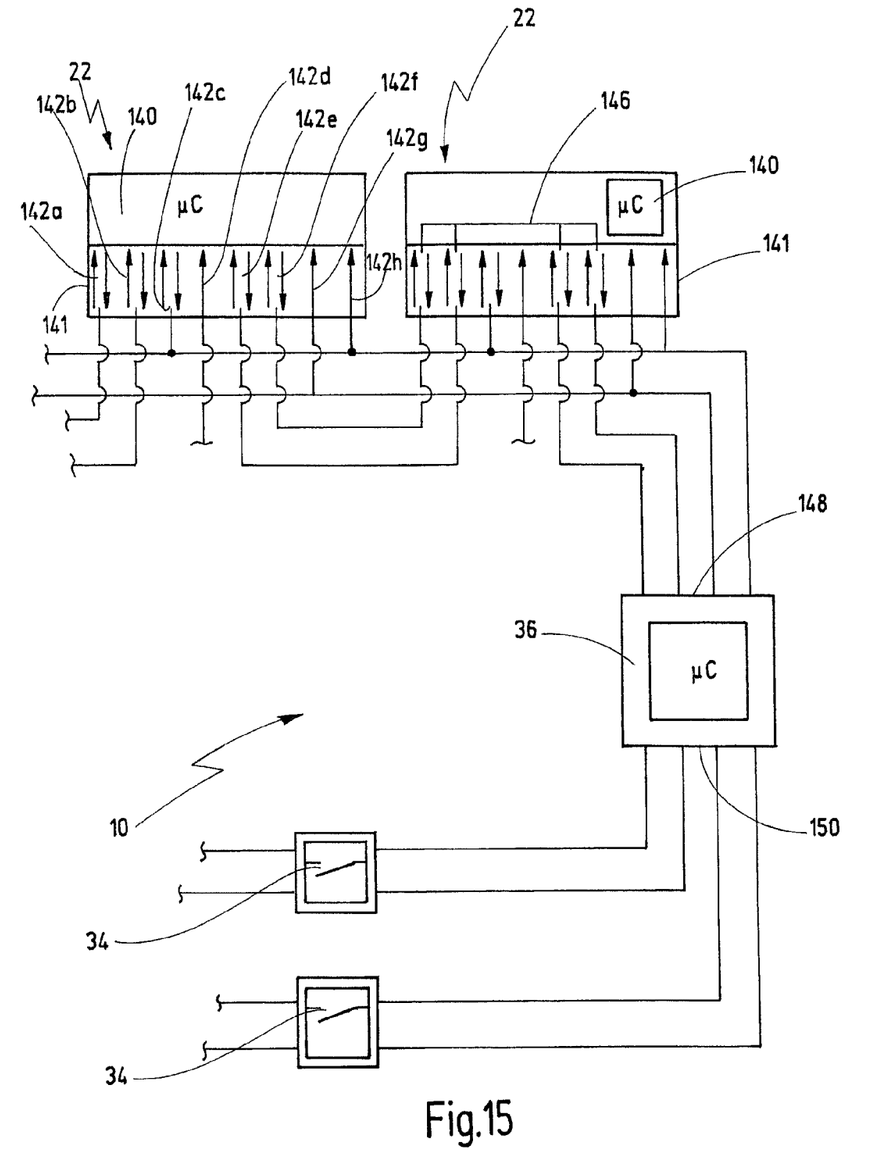
FIG. 15 shows a simplified schematic representation of a safety arrangement with two locking apparatuses.

For the more detailed description of a networked safety arrangement 10 and the cooperation between locking apparatuses 22 and a central control device 36, reference is made here to the following designs regarding FIG. 15.

It has been shown that locking devices for safety doors of enclosures have a certain tolerance in relation to deviations and displacements of the enclosure, in particular in relation to deviations in the alignment of the safety doors relative to door counterparts, in order to be able to ensure as fault-free an operation as possible and simple assembly without separate aligning or adjusting operations.

Thus, it is conceivable that locking apparatuses known in the prior art can be closed and locked even in the case of an offset, for instance a vertical offset caused by setting operations, however this can lead to tensions in the components of the locking apparatus and as a result, on the one hand to an increase in wear, on the other hand to faults and to failure such that secure, fault-free operation can no longer be guaranteed. In this connection, it must be considered that safety doors of enclosures of machines and systems can have quite considerable dimensions and weights, for example easily weights in excess of 100 kg, in excess of 200 kg or even more. Consequently, for instance in the case of the abrupt closure of such a heavy safety door, immense shock loads act upon the locking apparatus. Known locking apparatuses consequently have solid, rigid and relatively large components without this being necessary for the actual locking with tumbler, as essentially this is only to prevent manipulation by operating or maintenance personnel. As a result, known locking apparatuses with high expenditure can be produced at great costs, assembly and adjusting operations can be very expensive in time and money.

Contrary to this, embodiments of the invention provide an elastic compensating element which is realized for the purpose of overcoming such tolerances between the safety door and the door counterpart; in addition, however, to bring about certain decoupling between the safety door and the door counterpart even in the locked state such that the load on participating components is kept within limits.

Figures 2, 3:
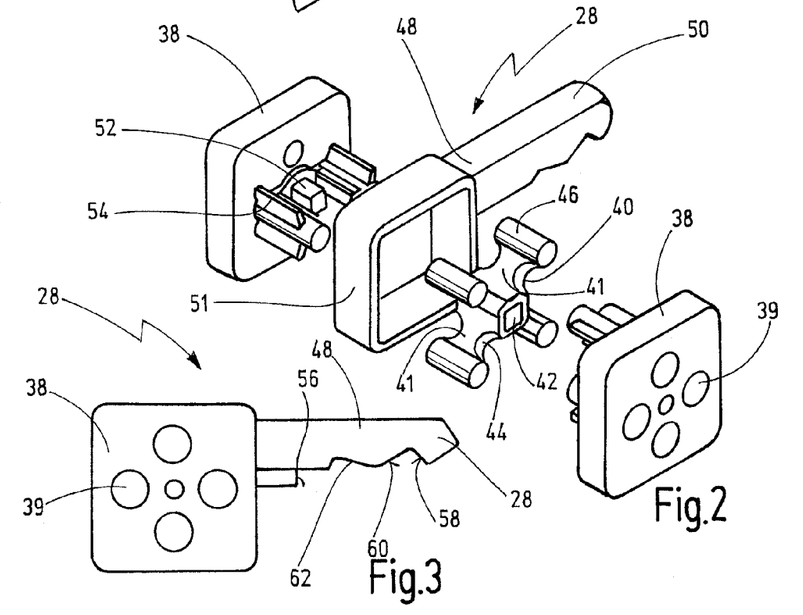
FIG. 2 shows a perspective view of a door part according to an embodiment the invention in an exploded illustration.
FIG. 3 shows a side view of the door part according to FIG. 2.

FIG. 2 shows a door part 28 according to an embodiment of the invention which can form the locking apparatus 22 for instance with the frame part according to FIG. 1.

The door part 28 has a door part housing 38 (in this case realized in two parts) on which an elastic compensating element 40 is arranged. The compensating element 40 has a plurality of webs 41 which are arranged about a receiving region 42. According to FIG. 2, a cruciform can essentially be produced, other developments, for instance in a star-shaped manner with three or more webs 41, are conceivable. The webs 41 have recesses 44 which represent regions of reduced cross section, thereby increasing the deformability of the compensating element 40.

On their end remote from the receiving region 42, thickened ends 46 are arranged on the webs 41, said thickened ends determining a preferred position of the compensating element 40 in an actuator frame 51.

The compensating element 40 is received on the door part housing by means of the receiving region 42 and is received on an actuator 48 by means of the thickened ends 46. The actuator 48 includes an actuator tip 50 and the actuator frame 51, which, in the present case, is realized as an almost rectangular, in particular square frame, in the corners of which the thickened ends 46 of the compensating element 40 can abut.

The door part housing 38 has a receiving profile 52, on which the elastic compensating element 40 is arranged by means of the receiving region 42.

The door part 28 is arranged on the safety door 18 by means of the door part housing 38; this can be brought about, for instance, by means of screws on the fastening openings 39, wherein it may be envisaged to cover the screw points or to use special profiles on the screw heads such that the screw connections cannot be released using commercially available tools in order to increase safety against manipulation.

When closing the safety door 18, i.e. when the actuator 48 is inserted into the frame part 26, deviations and tolerances between the door part 28 and the frame part 26 can be compensated by means of the elastic compensating element 40. Said compensation can also be effected whenever there continues to be an offset between the safety door 18 and the door counterpart 16 in the closed state of the locking apparatus 22. Through the deformability of the elastic compensating element 40, excessive load on the frame part 26 or on the door part 28 is avoided in the case of such deviations.

The compensating element 40 itself is protected adequately in the mounted state by the actuator frame 51 and the door part housing 38 (cf. also FIG. 9) such that in spite of a high level of elasticity of the compensating element 40, that is to say a possibly particularly soft design, damage to the compensating element 40 from outside can be avoided.

Figures 8, 9:
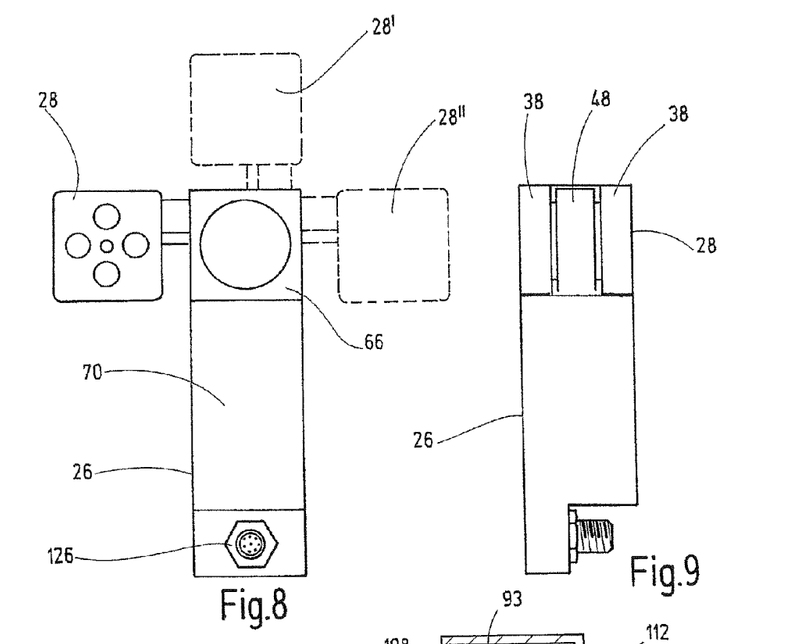
FIG. 8 shows a front view of a locking apparatus according to an embodiment the invention with different possible arrangements of the door part.
FIG. 9 shows a side view of the locking apparatus according to FIG. 8.

By way of FIGS. 2, 3 and 9 it can be seen that the elastic compensating element 40 in particular allows a displacement of the actuator 48 in relation to the door part housing 38, which displacement corresponds to a movement of the actuator 48 in relation to the door part housing 38 in a plane which is parallel to the view plane in FIG. 3. On the one hand, said displacement can be a rotation, for instance about the receiving profile 52; also conceivable is a straight line displacement, an offset or a combined movement which is produced finally by the present bearing deviation between the frame part 26 and the door part 28.

To compensate the displacement, webs 41 can be deformed in a defined manner, for example bent, lengthened or pressed together. Deforming stops 54, which determine maximum deformation of the elastic compensating element 40 and consequently can avoid damage by over-extension, are arranged on the door part housing 38. In the case of the elastic compensating element 40, in conjunction with the recesses 44, a progressive characteristic can be produced, for instance when the recesses 44 bring about a high degree of flexibility of the compensating element 40 when the deflections are relatively small, the deforming stops 54, however, being realized with the purpose of stiffening the compensating element 40 to a certain extent when the deflection is large.

In conjunction with FIG. 9 it can be seen that deflections, which, for instance, correspond to the actuator 48 yawing in relation to the door part housing 38, can be clearly defined in a tighter manner as the actuator 48, in this connection, can move very rapidly to abut laterally against the door part housing 38.

The blocking and releasing of a safety apparatus 22 of the invention is explained with reference to FIGS. 3, 4, and 5.

The actuator 48 is insertable with the actuator tip 50 in a receptacle 66 of the frame element 26. An insertion stop 56, which prevents the actuator 48 penetrating too deeply into the receptacle 66, is provided on the actuator 48.

In addition, blocking surfaces 58, 60 and a recess 62 are realized on the actuator 48. In the present case, blocking surfaces 58, 60 together with the recess 62 form overall an approximately M-shaped cutout on the actuator 48.

Along with the receptacle 66, the frame part 26 additionally has a blocking member 68 as well as a position detector 69. According to the development in FIG. 4, the blocking member 68 is arranged on the receptacle 66 which is received on a frame part housing 70.

Figures 4, 5:
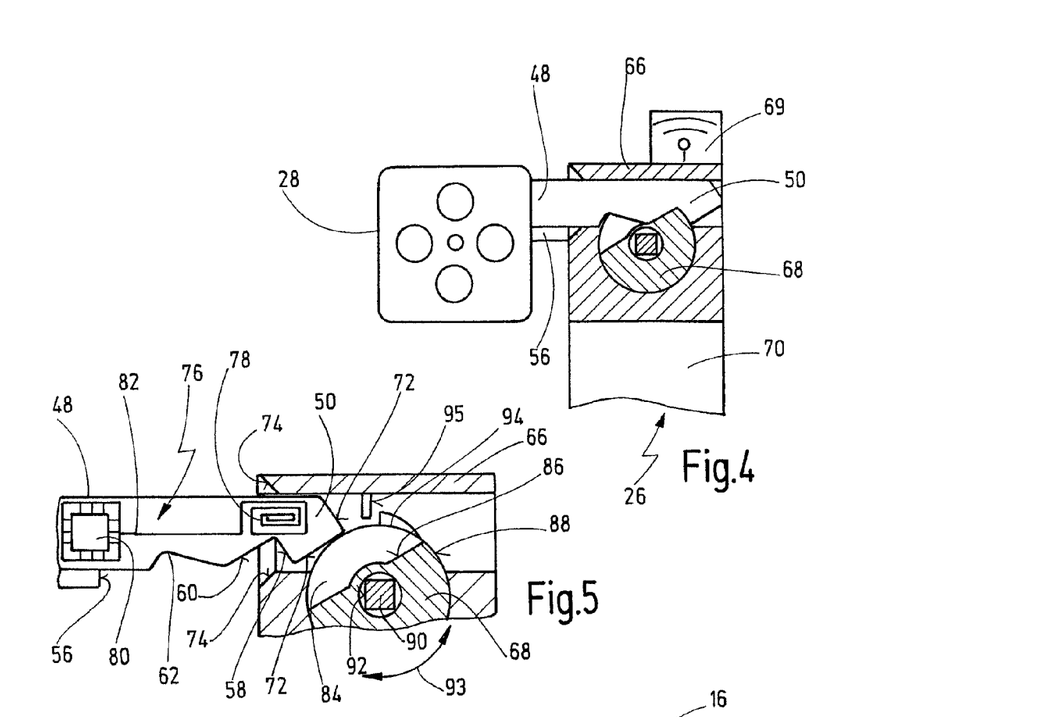
FIG. 4 shows a fractional representation of a locking apparatus according to an embodiment the invention.
FIG. 5 shows a view of a detail in the representation according to FIG. 4.

FIG. 4 shows a position which corresponds to a blocking position. The actuator 48 is inserted into the receptacle 66 and is secured thereon by means of the blocking member 68. In this state, the safety door 18 cannot be opened. The robot 12 can be put into operation.

In contrast, FIG. 5 shows the actuator 48 when being supplied in the direction of the receptacle 66.

In order to simplify the insertion, lead-in inclinations 72 are realized on the actuator 48 and lead-in inclinations 74 are realized on the receptacle 66 such that when there is a displacement, the locking apparatus 22 being realized for the compensation of said displacement, the actuator 48 "finds" its path to the receptacle 66 in a reliable manner.

A transponder 76 is arranged on the actuator 48, with an antenna 78 and a signal unit 80, which are connected by means of a line 82. The position detector 69 (not shown in FIG. 5) is realized for detecting the inserted state of the actuator 48 by way of a signal of the transponder 76. The transponder 76 is preferably realized as an RFID unit. The signals are transmitted wirelessly from the antenna 78 to the position detector 69. The position detector 69 can additionally be realized for supplying the transponder 76 with energy; this can be brought about by means of electromagnetic waves, under the effect of which a coil of the antenna 78 can induce a voltage.

As an alternative to this, the transponder 76 can also be realized as an active RFID unit, consequently having its own energy supply, for instance by means of batteries or separate supply lines.

According to the representation in FIG. 5, the antenna 78 is at a clear spacing from the signal unit 80. Mechanical damage of the actuator 48, for instance a fracture, can be recognized in this way as in the event of a failure of the line 82, which can pass through essential regions of the actuator 48, signal transmission by means of the antenna 78 is no longer possible such that the position detector is not able to output a release signal.

If the actuator 48, proceeding from the arrangement in FIG. 5, is supplied further in the direction of the receptacle or is inserted into said receptacle (that is to say displaced to the right in FIG. 5), first of all the actuator tip 50 will penetrate into an insertion region 84 of the blocking member 68 and the lead-in inclinations 72 contact a blocking counter surface 86 of the blocking member 68, as a result of which the blocking member 68, as indicated by the arrow 93, is pivoted about an entrainment shaft 90. When advanced further, the blocking member 68, with the blocking counter surface 86 and a blocking counter surface 88, can latch into a recess of the actuator 48 formed by the blocking surfaces 58, 60, cf. also FIG. 4. The locking apparatus 22 is secured in this state.

In the event of contamination of the locking apparatus 22, for instance by means of chips or the like, the recess 62, which defines a cavity together with the insertion region 84 in the locked state, can also make possible an unlocking process; consequently an opening of the safety door 18. To unlock, the blocking member 68, proceeding from the position shown in FIG. 4, has to be pivoted in the direction of a release position (in FIGS. 4 and 5, that is to say in a clockwise manner) such that the blocking counter surfaces 86, 88 are guided out of engagement with the blocking surfaces 58, 60, as a result of which the actuator 48 can be removed from the receptacle 66 of the frame part 26. The recess 62 can now prevent chips or other foreign bodies from blocking the desired displacement of the blocking member 68 if they pass into the insertion region 84. In other words, the recess 62 creates a "gap" into which such foreign bodies can be pushed such that a sufficient pivot angle of the blocking member 68 remains freely movable in order to unlock the actuator 48 in the release position.

The blocking member 68 also has a stop 94 which limits the pivoting of the blocking member 68 in the direction of the blocking position together with a stop counter surface 95 which is provided on the receptacle 66.

Figure 6:
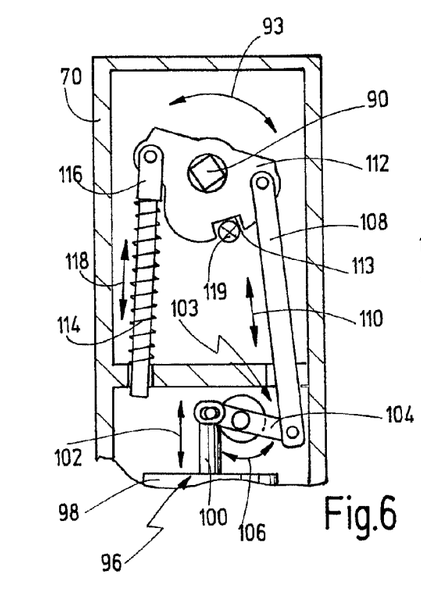
FIG. 6 shows a fractional sectional view of a frame part housing of a locking apparatus according to an embodiment the invention.
Figures 10, 11:
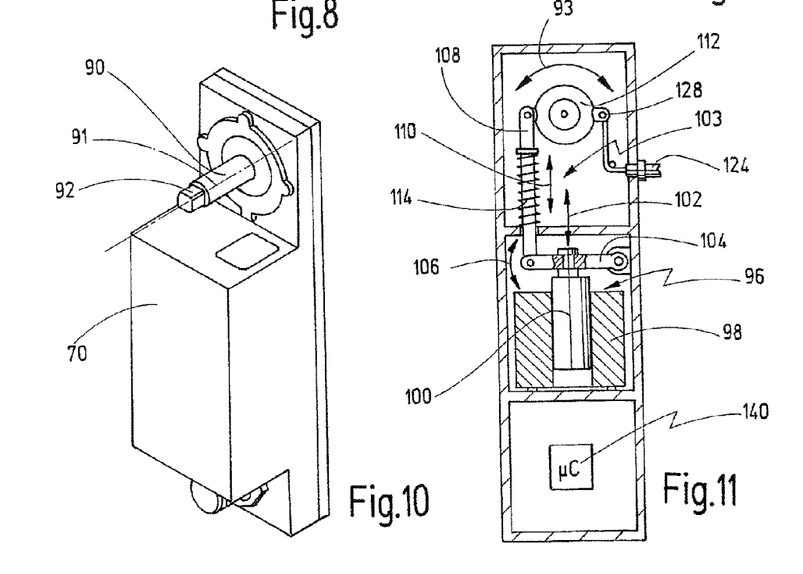
FIG. 10 shows a perspective view of a frame part housing, a blocking member having been removed.
FIG. 11 shows a sectioned front view of the frame part housing according to FIG. 10.

The drive of the blocking member 68 can be explained in conjunction with FIGS. 6, 10 and 11.

The blocking member 68 is received on an entrainment profile 92 of the entrainment shaft 90 which is pivotable about an axis 91. FIG. 10 shows the state where the blocking member 68 together with the receptacle 66 is removed from the frame part 26. The drive of the entrainment shaft 90 is effected by means of an actuator 96, which is shown as a solenoid magnet in a simplified manner in FIGS. 6 and 11. The actuator 96 has a container 98 fixed to the frame as well as a displaceable inductor 100.

The inductor 100 is realized for carrying out a translatory movement, as indicated by the arrow 102, in order to propel a coupling drive 103. According to FIG. 6, the coupling drive 103 has a coupling member 104 which is pivotable, as indicated by an arrow 106; further, it has a coupling member 108 which is essentially displaceable, as indicated by an arrow 110, although the movement of the coupling member 108 is not purely translatory. The coupling member 108 acts upon a further coupling member 112 in order to pivot it, as indicated by the arrow 93. The blocking member 68 is connected in a rotationally fixed manner to the coupling member 112 by means of the entrainment shaft 90. In addition, a safety spring 114, which loads the blocking member 68 in the direction of the blocking position, is provided on the frame part housing 70. The safety spring 114 acts by means of a further coupling member 116, for instance in a direction indicated by an arrow 118, onto the coupling member 112 and consequently onto the blocking member 68.

A design of this type corresponds to the regular case. The blocking member 68 is in a state where the actuator 96 is not supplied with current, permanently pushed in the direction of the blocking position (according to FIG. 5 pushed in an anticlockwise manner). In a state in which the actuator 96 is supplied with current, the actuator pushes the blocking member 68 against the spring in the direction of the release position.

For particular applications, said principle can be reversed. An embodiment results in which the blocking member is pushed toward the release position in a currentless manner and only remains in the blocking position when there is current.

A manipulation detector 119, which is indicated symbolically as an optical sensor, for instance as a light barrier, is arranged on the frame part housing 70. A recess 113 is provided on the coupling member 112, which recess is designed for allowing light from a light barrier to pass at a certain pivot position of the coupling member 112, thereby allowing the manipulation detector 119 to respond. A state which corresponds to the representation in FIG. 10 can be recognized in this manner, i.e. a state when the blocking member 68 is removed from the frame part 26. For this purpose, the stop 94 or the stop counter surface 95 are realized on the receptacle 66 or on the blocking member 68, said stop or stop counter surface, as explained above, limiting the pivoting of the blocking member 68 in the direction of the blocking position; it is envisaged that where the stop 94 abuts against the stop counter surface 95 (contrary to the representation in FIG. 5), the safety spring 114 pretensions the blocking member 68 further in the direction of the stop.

The pivoting of the coupling member 112 is also limited by the stop 94. If the blocking member 68, together with receptacle 66 where applicable, is now removed from the frame part 26, said positional limiting does not apply to the coupling member 112. Since pretensioning is still present due to the safety spring 114, the coupling member 112 can be pivoted further into a position as shown in FIG. 6. In this position the recess 113 opens the path for the manipulation detector 119 and a signal can be output in order to avoid the machine to be enclosed and to be secured being put into operation.

Figure 7:
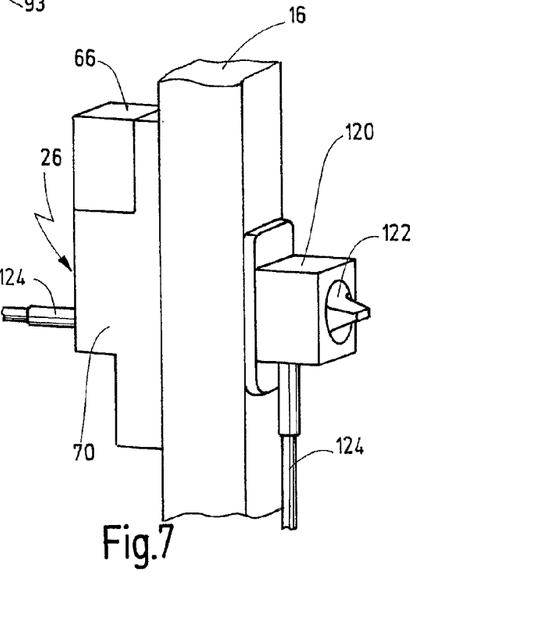
FIG. 7 shows a perspective representation of a locking apparatus according to an embodiment the invention with an unlocking mechanism.

FIG. 7 shows a frame part 26 including an unlocking mechanism 120. The unlocking mechanism 120 enables emergency unlocking of the locking apparatus 22 by hand, for instance if an operator has inadvertently been locked inside the enclosure. For this purpose, the unlocking mechanism 120 is arranged on the door counterpart 16, for example. In particular, the unlocking mechanism 120 should not be activatable from the outside of the enclosure.

The unlocking mechanism 120 has a rotary knob 122 which is coupled mechanically, in the present case by means of a Bowden cable 124, to the frame part. Activation of the rotary knob 122 brings about, by means of the Bowden cable 124, a pivoting of the blocking member 68, for instance indirectly by means of the coupling member 112, in the direction of the release position, after which the safety door 18 can be opened in order to be able to leave a potentially dangerous area.

The high variety of applications of the locking apparatus 22 of the invention can be shown by way of FIGS. 8, 9 and 10.

As already stated, the blocking member 68 is arranged in a positive locking manner on the entrainment profile 92 of the entrainment shaft 90. The blocking member 68 can, where applicable, together with the receptacle 66, be detached from the entrainment shaft 90 or the frame part housing 70, rotated and then assembled in a new position. The variations, which in each case represent supply directions for the door part 28 and which result from the entrainment profile 92 being realized as a square, are indicated in FIG. 8 by 28, 28' and 28". Consequently, with only one embodiment, in particular without having to exchange or replace parts, adaptation of the locking apparatus 22 to the most different installation conditions can be effected by a simple conversion of the frame part 26. Thus, the supply direction of the door part 28 in FIG. 8 is suitable, for instance, for a sliding door opening to the left, the supply direction of the door part 28" for a sliding door opening to the right and the supply direction of the door part 28' for a rolling shutter arranged above.

The frame part 126 can be connected to the connecting line 30 by way of the connection plug given the reference 126 in FIG. 8.

FIG. 11 shows an alternatively coupling drive which is connected between an actuator and a coupling member. A recess 128, into which the Bowden cable 124 of an unlocking mechanism 120, for instance according to FIG. 7, can engage, is arranged on the coupling member.

Figure 12:
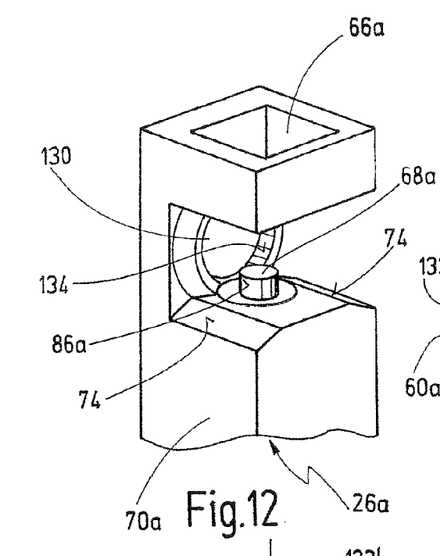
FIG. 12 shows a perspective fractional representation of a frame part according to another embodiment of the invention.
Figure 13:
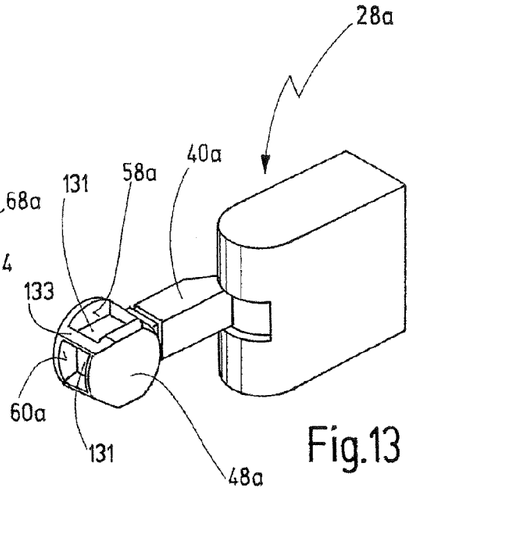
FIG. 13 shows a perspective representation of a door part which is suppliable to the frame part according to FIG. 12.
Figure 14:
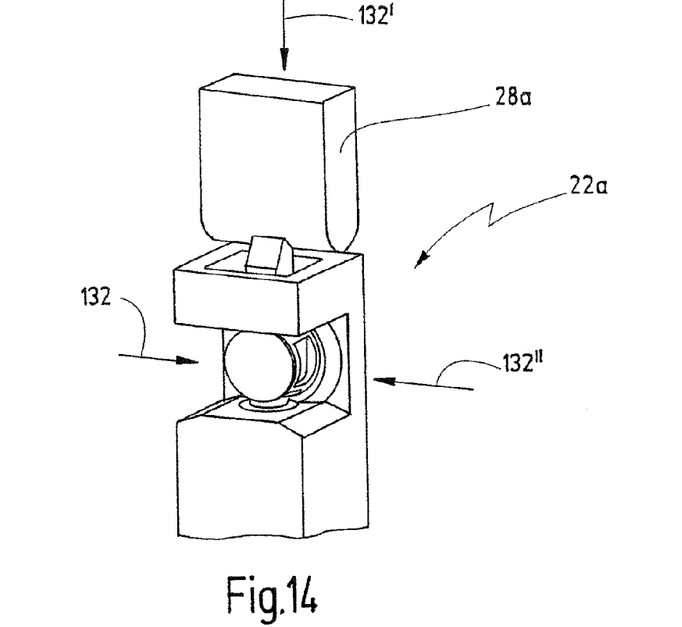
FIG. 14 shows a perspective representation of the locking apparatus with the frame part according to FIG. 12 and the door part according to FIG. 13.

FIGS. 12, 13 and 14 represent an alternative embodiment of a locking apparatus 22a according to the invention.

FIG. 12 shows a frame part 26a, which has a receptacle 66a and a blocking member 68a, which is displaceable in a translatory manner for securing an actuator 48a (cf. FIG. 13). A conical seat 130, which has conical counter surfaces 134, in which the actuator 48a can be inserted, is also realized on the frame part 26a. The actuator 48a, for this purpose, has appropriate cone surfaces 133. There is a container-like receptacle for the actuator 48a. The actuator 48a is received on a door part 28a by means of an elastic compensating element 40a.

The conical seat 130 makes it possible for the actuator 48a to be supplied from different directions on account of its rotationally symmetrical development, as is indicated by the arrows 132, 132', 132" in FIG. 14.

To secure the actuator 48a, blocking surfaces 58a, 60a, which are arranged in recesses 131, are also realized on said actuator. In this connection, it is noted that on account of the different possible supply directions 132, 132', 132", accessibility of the blocking surfaces 58a, 60a to different positions of the actuator 48a has also to be ensured.

FIG. 14 shows the actuator 48a inserted into the conical seat 130 along the supply direction 132' and secured by the blocking member 68a with a blocking surface 86a against the blocking surface 60a. Consequently, releasing the actuator 48a from the conical seat 130 is prevented such that the closed state of the locking apparatus 22a is secured. It must be added that where the door part 28a is loaded in the direction of an open position of the locking apparatus 22a, that is to say, for instance, in opposition to the arrow 132' in FIG. 14, the conical seat 130 can take up a large part of said load and the blocking member 68a, which essentially only has to prevent the actuator 48a being released from the conical seat 130, only has to withstand a small proportion of said load. Consequently, the blocking member 68a can be realized in a relatively small manner, whilst the locking apparatus 22a is able to withstand high forces.

FIG. 15 shows a simplified schematic representation of a wiring circuit of a safety arrangement 10 with two locking apparatuses 22, one control device 36 and two safety switches 34. As mentioned previously, the safety arrangement 10 can include further safety devices.

The control device 36 is designed for receiving signals from the locking apparatuses 22 by means of a system interface 148, and designed for processing them and as a function thereof activating the safety switches 34 by means of system interface 150 in order to be able to put a machine or system in operation or to switch it off.

In order to minimize expenditure on cabling and connections, it is envisaged to couple several locking apparatuses 22 and to connect them to a control device 36 by means of a common line. The line, in this case, is realized in an advantageous manner as a bus line such that few conductors are needed in comparison with discrete cabling.

The locking apparatus 22 has a control unit 140, which is connected to the control device 36 by means of an interface 141, which has a plurality of connections 142 which can be realized as unidirectional or bidirectional connections.

The connections 142a, 142b, 142c, 142e and 142f are realized as bidirectional connections, whilst the connections 142d, 142g and 142h are realized as unidirectional connections. It can be recognized that the number of connections 142 of the locking apparatus 22 is greater than the number of conductors which are supplied to the control device 36 by means of the system interface 148. This can be made possible by using an internal bus 146 which bundles the signals of individual connections in bus mode in the manner of a bus, and makes them available to the control device by means of a reduced number of conductors.

To couple or connect several locking apparatuses 22, it is envisaged to operate individual connections 142, which, as a rule, are realized only for the output but not for the input of signals, in a bidirectional mode such that along with the output of signals, also signals which come from a further locking apparatus 22, can be received. In this case too, a received signal of a locking apparatus 22 arranged upstream can be prepared in the manner of a bus and together with the signal of the current locking apparatus 22 can be sent in the manner of a bus to a further locking apparatus 22 arranged downstream (not shown).

Both the internal bus mode, which serves to bundle signals which are generated by one locking apparatus 22, and the external bus mode which serves to bundle signals where several locking apparatuses 22 are connected, can be activated in a selective manner such that the locking apparatus 22 can also be operated in a fully independent manner and can be cabled or actuated in a discrete manner.

According to the representation in FIG. 15, the connection 142d is not coupled to the control device 36. This can be, for instance, a supply line which, for example, provides supply voltage for the actuator 96 according to FIG. 6; alternatively, said supply line can also be coupled to the control device 36.

Therefore, a locking apparatus has been provided which, with a simple design, is able to be operated securely, is distinguished in operation by a high level of robustness and in particular high tolerance in relation to development deviations of the components to be locked and which, in addition, can be arranged in a multidirectional manner and can be connected or networked in a particularly simple manner with a small amount of expenditure.

What is claimed is:

1. A locking apparatus for safety doors having a movable door and a door counter part, said locking apparatus comprising:
    a door part designed for being fastened on the movable door, and
    a frame part designed for being fastened on the door counter part,
    wherein the frame part has a receptacle and the door part has an actuator configured to be inserted into the receptacle,
    wherein the frame part further has a blocking member which is displaceable between a release position, in which the actuator can be withdrawn from the receptacle, and a blocking position in which the actuator is secured in the receptacle,
    wherein the actuator is arranged on the door part via an elastic element made from an elastomer or a rubber material and configured to allow a limited rotational movement of the actuator relative to the door part so as to compensate for a vertical offset between the movable door and the door counter part,
    wherein the elastic element has a central receiving region and a plurality of webs arranged around the central receiving region in a cruciform or star-shaped manner and extending therefrom, and
    wherein the actuator has an actuator frame in which the webs are arranged, and wherein the door part has a receiving profile on which the receiving region is mounted.

2. The locking apparatus of claim 1, wherein the webs each have a thickened end remote from the receiving region, the thickened ends holding the elastic element in the actuator frame.

3. A locking apparatus for safety doors having a movable door and a door counter part, said locking apparatus comprising:
    a door part designed for being fastened on the movable door, and
    a frame part designed for being fastened on the door counter part,
    wherein the frame part has a receptacle and the door part has an actuator configured to be inserted into the receptacle,
    wherein the frame part further has a blocking member which is displaceable between a release position, in which the actuator can be withdrawn from the receptacle, and a blocking position in which the actuator is secured in the receptacle,
    wherein the actuator is arranged on the door part via an elastic element made from an elastomer or a rubber material and configured to allow a limited rotational movement of the actuator relative to the door part so as to compensate for a vertical offset between the movable door and the door counter part,
    wherein the actuator has at least one blocking surface and the blocking member has at least one blocking counter surface, said at least one blocking surface and said at least one blocking counter surface cooperating for securing the actuator in the receptacle in a form-fit manner in the blocking position, and
    wherein the actuator has a recess adjacent to the at least one blocking surface, said recess defining a space into which the blocking member can at least partially advance in order to release the actuator.

4. The locking apparatus of claim 3, wherein the actuator has an M-shaped incision defining the at least one blocking surface and the recess.

5. The locking apparatus of claim 3, further comprising a drive coupled to the blocking member and configured to move the blocking member between the release position and the blocking position.

6. The locking apparatus of claim 5, wherein a plurality of coupling members is arranged between the drive and the blocking member, the plurality of coupling members being configured for converting a translational movement of the drive into a rotational movement of the blocking member.

7. A locking apparatus for safety doors having a movable door and a door counter part, said locking apparatus comprising:
    a door part designed for being fastened on the movable door, and
    a frame part designed for being fastened on the door counter part,
    wherein the frame part has a receptacle and the door part has an actuator configured to be inserted into the receptacle,
    wherein the frame part further has a blocking member which is displaceable between a release position, in which the actuator can be withdrawn from the receptacle, and a blocking position in which the actuator is secured in the receptacle,
    wherein the actuator is arranged on the door part via an elastic element made from an elastomer or a rubber material and configured to allow a limited rotational movement of the actuator relative to the door part so as to compensate for a vertical offset between the movable door and the door counter part, and
    further comprising a safety spring coupled to the blocking member for pushing the blocking member into the blocking position.

8. The locking apparatus of claim 7, wherein the blocking member is detachably arranged on an entrainment shaft which is pivotable about a defined axis of rotation.

9. The locking apparatus of claim 7, wherein the frame part comprises a manipulation detector designed for detecting whether the blocking member is actually mounted in the frame part.

10. The locking apparatus of claim 7, wherein the actuator comprises a transponder and wherein a position detector is arranged on the frame part, said transponder and position detector cooperating in such a manner that a release signal is generated when the actuator is secured in the frame part and the blocking member is situated in the blocking position.

11. The locking apparatus of claim 10, further comprising a control unit designed for receiving the release signal and for generating a machine enable signal.

12. The locking apparatus of claim 11, wherein the control unit has an interface for receiving the release signal and for generating a control signal configured to transfer the blocking member from the blocking position into the release position.

13. A locking apparatus for safety doors having a movable door and a door counter part, said locking apparatus comprising:
- a door part designed for being fastened on the movable door, and
- a frame part designed for being fastened on the door counter part,
- wherein the frame part has a receptacle and the door part has an actuator configured to be inserted into the receptacle,
- wherein the frame part further has a blocking member which is displaceable between a release position, in which the actuator can be withdrawn from the receptacle, and a blocking position in which the actuator is secured in the receptacle,
- wherein the actuator is arranged on the door part via an elastic element made from an elastomer or a rubber material and configured to allow a limited rotational movement of the actuator relative to the door part so as to compensate for a vertical offset between the movable door and the door counter part, and
- further comprising an unlocking mechanism coupled to the blocking member in order to manually move said blocking member from the blocking position into the release position.

* * * * *